United States Patent [19]

Lee

[11] Patent Number: 5,234,736

[45] Date of Patent: Aug. 10, 1993

[54] STOCK FOR LABELS AND TAPES UTILIZING SILICONIZED EMULSION BASED PRESSURE-SENSITIVE ADHESIVES

[75] Inventor: Ivan S. P. Lee, Arcadia, Calif.

[73] Assignee: Avery Dennison Corporation, Pasadena, Calif.

[21] Appl. No.: 648,213

[22] Filed: Jan. 31, 1991

Related U.S. Application Data

[63] Continuation-in-part of Ser. No. 315,507, Feb. 24, 1989, Pat. No. 4,994,538.

[51] Int. Cl.$^5$ ............................................. B32B 27/30
[52] U.S. Cl. ........................................ 428/42; 428/40; 428/447; 524/806; 525/479; 528/26; 526/279
[58] Field of Search ................ 528/26; 525/479; 526/279; 524/806; 428/40, 42

[56] References Cited

U.S. PATENT DOCUMENTS

| | | | |
|---|---|---|---|
| 2,391,539 | 12/1945 | Avery | 428/42 |
| 3,519,525 | 7/1970 | Jackstadt | 428/42 |
| 3,551,391 | 12/1970 | Crocker | 526/279 |
| 3,558,574 | 1/1971 | Doehnert | 526/279 |
| 3,575,910 | 4/1971 | Thomas | 524/806 |
| 3,617,362 | 11/1971 | Bemmels et al. | 526/279 |
| 3,707,518 | 12/1972 | Bemmels et al. | 526/279 |
| 3,729,438 | 4/1973 | Plesich | 524/806 |
| 3,808,287 | 4/1974 | Thomas | 525/479 |
| 3,914,484 | 10/1975 | Creegan et al. | 428/42 |
| 4,112,213 | 9/1978 | Waldman | 526/279 |
| 4,147,685 | 4/1979 | Smith | 526/279 |
| 4,333,867 | 6/1982 | Saunton | 524/547 |
| 4,625,006 | 11/1986 | Bernhardt et al. | 526/279 |
| 4,693,935 | 9/1987 | Mazurek | 428/352 |
| 4,716,194 | 12/1987 | Walker et al. | 524/806 |
| 4,994,538 | 2/1991 | Lee | 526/279 |

Primary Examiner—Ralph H. Dean, Jr.
Attorney, Agent, or Firm—Christie, Parker & Hale

[57] ABSTRACT

There is provided stock for labels and tapes having in the surface of a self supporting substrate and inherently tacky pressure-sensitive adhesive polymers prepared by emulsion polymerization and containing an interpolymerized amount of a reactive silicone acrylate polymer, an unsaturated carboxylic acid one or more alkyl acrylates, preferably a mixture of butyl acrylate and 2-ethylhexyl acrylate. Methyl acrylate and vinyl acetate are optionally present.

36 Claims, No Drawings

STOCK FOR LABELS AND TAPES UTILIZING SILICONIZED EMULSION BASED PRESSURE-SENSITIVE ADHESIVES

CROSS REFERENCE TO RELATED APPLICATIONS

This is a continuation-in-part of application Ser. No. 07/315,507 filed Feb. 24, 1989, now U.S. Pat. No. 4,994,538.

BACKGROUND OF THE INVENTION

The present invention is directed to silicon acrylate containing acrylic-based emulsion pressure-sensitive adhesives which exhibit excellent processability including guillotinability and water resistance.

The concern over the environment has made pressure-sensitive adhesive polymers formed by emulsion or bulk polymerization, as opposed to polymerization in organic solvents attractive. Emulsion polymers can be coated onto a substrate, e.g. face material, release liner, and/or a transfer surface, and a pressure-sensitive adhesive layer formed upon water evaporation. The resultant coated substrate stock can be readily converted into tapes, sheets and labels.

The possibility of preparing a pressure-sensitive adhesive in an emulsion has been mentioned in the art. Examples include U.S. Pat. No. 3,637,615 to Coffman, U.S. Pat. No. 4,069,123 to Skoultchi et al, and U.S. Pat. No. 4,185,050 to Lazear et al.

While the possibility of preparing emulsion pressure-sensitive adhesives has been mentioned, the art in exemplifying the best mode of invention has adhered to the preparation of pressure-sensitive adhesive polymers in an organic solvent. The reason may be the fact that the quality of the emulsion adhesives was poor and the emulsion-based pressure-sensitive adhesives were more of a curiosity than a way to eliminate the organic solvent.

Emulsion-based pressure-sensitive adhesives have been found, as compared to solvent-based adhesives, to generally have deficient performance properties in certain respects, such as water resistance. The present invention is directed to emulsion polymers which overcome the deficiencies of the prior art emulsion polymers and enjoy excellent processability as part of a stock for use in tape, sheet and label manufacture and in that application enjoys excellent adhesive performance.

SUMMARY OF THE INVENTION

In accordance with the invention there is provided tacky pressure-sensitive adhesive stock for tape, sheet and label manufacture which comprise a substrate providing on at least one surface thereof an emulsion polymer which contain an interpolymerized amount of a reactive silicon polymer having acrylate functionality greater than about 2 and which display excellent processability and adhesive performance characteristics including performance comparable to solvent adhesives.

The tacky emulsion polymers, use in formation a tape and label stock contain, based on the total weight of the tacky polymer, from about 0.02 to about 1%, more preferably about 0.2 to about 0.3% by weight of reactive silicone acrylate polymer having an acrylate functionality of at least about 2; from about 3 to about 10% by weight of an unsaturated carboxylic acid containing from 2 to about 4 carbon atoms, from about 0 to about 15% by weight methyl acrylate, from 0 to about 15% by weight vinyl acetate, the balance of the monomers comprising soft monomers, preferably alkyl acrylates. The preferred alkyl acrylate monomers are butyl acrylate and 2-ethylhexylacrylate preferably, butyl acrylate being present in an amount of from about 60 to about 70% by weight of the polymer acrylate and from about 20 to about 30% by weight, the polymer being 2-ethylhexylacrylate.

Emulsion polymerization typically occurs at a temperature of from about 75 to about 85° C. in the presence of an emulsifier system which comprises at least one surfactant and at least on water soluble initiator. The adhesive product formed displays permanent adhesive properties. It is, also, a high performance adhesive exhibiting excellent water or moisture resistance, gasoline resistance, and specific adhesion to automotive paints.

Stock formed using the adhesive has excellent processability including slitting into tapes, guillotining into sheets and die cutting with or without matrix stripping into labels which is comparable to or superior to solvent based adhesives.

DETAILED DESCRIPTION

According to the present invention, there is provided a pressure-sensitive adhesive stock which exhibits excellent processability including slitting into tapes, guillotining to form sheets, and die cutting with or without matrix stripping to form labels. The stock comprising a substrate having on at least one surface a emulsion acrylic-based, pressure-sensitive adhesives containing as part thereof minor amounts of one or more reactive silicone acrylate polymers as part of the monomer system undergoing emulsion polymerization.

By the term "reactive silicone acrylate polymers" there is meant polymeric siloxanes and silicones displaying acrylate functionality including but not limited to acrylated polysiloxanes, and acryl modified polysiloxanes. Acrylate functionality is at least 2, preferably from 2 to about 3 typically from about 2.5 to about 2.7. Exemplary of the multifunctional silicone acrylate there may be mentioned the Tego ® Silicone acrylates RC 149, 300, 450, 710, 720 and 802 and ZMR1395 manufactured and sold by Goldschmidt Chemical Corporation of Hopewell, Va., which polymers are linear dimethylpolysiloxanes with acrylate functionality and molecular weight between about 1000 and 20,000 g/mol and include dimethylpolysiloxanes with pentaerythritoltriacrylate. Ethyl-substituted polysiloxanes may also be used.

The reactive silicone acrylate polymers are employed in a concentration of from about 0.02 to about 1 percent, preferably from about 0.1 to about 1 percent more preferably 0.2 to about 0.3 percent by weight of the tacky polymer. They function to improve cohesive strength, adhesion to low energy surfaces and moisture resistance.

The bulk of the monomers of the pressure-sensitive adhesives emulsion polymers of the instant invention are soft monomers the bulk of which are alkyl acrylic monomers present in a total amount of from about 50 to about 95% by weight of the tacky polymer. By a "soft monomer" there is meant a monomer which when homopolymerized will have a glass transition temperature of less than 0° C. Exemplary of the acrylic soft monomers that may be mentioned include alkyl acrylates, such as butyl acrylate, propyl acrylate, 2-ethylhexyl acrylate, isooctyl acrylate, isodecyl acrylate, and the like. The preferred soft monomers are butyl acrylate present in a concentration of about 60 to about 70% based on the total weight of the tacky polymer in combination with 2-ethylhexyl acrylate present in a concentration of from about 20% to about 30% by weight of the tacky polymer. Other soft monomers such as the dialkyl fumarates and maleates may also be present.

The balance of the monomer system is comprised of hard monomers, i.e., monomers which if homopolymerized would have glass transition temperature above about 0° C. Among such monomers there may be mentioned methyl acrylate, ethyl acrylate; alkyl methacrylates, such as methyl methacrylate, butyl methacrylate; vinyl acetate and the like each present in an amount of from 0 to about 15 preferably about 5 to about 10 percent by weight of the tacky polymers and serve to modify adhesive properties. Ethyl acrylate may also be used as hard monomer.

Also present and present as a hard monomer is one or more unsaturated carboxylic acids containing from 2 to about 4 carbon atoms, such as acrylic acid, methacrylic acid, itaconic acid, fumaric acid and the like. They serve to provide to improve cohesive strength and promote adhesion and are present in a concentration of from about 3 to about 10 percent by weight preferably from about 3 to about 6 percent by weight of the tacky polymers.

Emulsion polymers prepared in accordance with the present invention, to be functional pressure-sensitive adhesives, must have a net effective glass-transition temperature below about −15° C., preferably from about −30° to about −45° C., typically about −35° C. Accordingly, the monomers used in the preparation of tacky polymers of the instant invention are proportioned to provide polymerization products falling within the designated glass-transition temperature. It is for this reason that the soft monomers, preferably one or more alkyl acrylates, are provided as the bulk of the monomers employed. In addition to the monomers there may be added multifunctional acrylates and methacrylates and like cross-linking agents.

It will be appreciated that there may be included in the pressure-sensitive adhesives other tackifiers, modifying polymers both tacky and non-tacky, fillers, plasticizers, and the like.

Emulsion-based, pressure-sensitive adhesive tacky polymers may be prepared in accordance with the present invention by polymerizing the monomers to yield a polymer having a suitable glass-transition temperature having direct utility for substrate coating at solids content ranging from about 40 to about 72% by weight solids, generally from about 50% to about 70% by weight solids. Catalysts, such as potassium persulfate, tertiary butyl hydroperoxide or the like, may be present in an amount of from about 0.15 to about 0.5 part by weight per 100 parts monomers with surfactant levels ranging from about 0.5% to about 5% by weight based on weight of the monomers being preferred. Reaction temperatures generally range from about 75° C. to about 85° C.

In addition, there may be included "chain transfer agents" by which there is meant organic compounds containing mono- or multi-mercaptan groups, chlorinated groups, hydroxy groups, and the like, as are known in the art. The presently preferred chain transfer agents are n-dodecyl mercaptan and t-dodecyl mercaptan provided in a concentration from about 0.01 to about 0.1 percent by weight of the monomers.

Tacky emulsion polymers of the instant invention can be prepared to provide both a high cohesive strength and holding power and adhesion to a variety of substrates as well as moisture resistance as exhibited by a resistance to water spotting far in excess of an hour. Significantly, they exhibit properties comparable to solution polymers a result difficult to achieve in emulsion polymerization.

The inclusion of multifunctional monomers and chain transfer agents as part of the monomer system results in formation of emulsion polymers which are internally cross-linked. This differs from externally cross-linked polymer in that the functional groups, such as carboxyl, hydroxyl, amino, and/or carboxyl groups, remain free and available for improving adhesive bond and are available for external cross-linking reactions and adhesive properties can be further enhanced by exposure to actinic, electron beam radiation and/or external cross-linking agents.

As indicated the adhesives of the invention can be directly coated or transferred to or laminated to one or both sides of self supporting substrates such as paper, polyester (Mylar), polyethylene and the like. The product can be slit into tapes or combined with a release liner and for guillotining into sheet stock and the like and/or die cut with or without matrix stripping into labels supported by the release liner. Excellent processability has been realized making the construction of invention highly competitive with solvent based adhesives while reducing environmental problems.

More particularly stock for conversion into tape a substrate such as paper is provided, on one surface with a release coating and on the opposite side coated with the pressure-sensitive adhesive. The stock so produced is formed into rolls of the desired diameter and slit to form tapes.

For guillotining operations the stock is coated on one surface with the adhesive and laminated to a release liner. Stacks of this formed laminate are then guillotined in sheets of a reduced size for processing into labels and the like.

Labels can be formed by die cutting rolls or sheets of the laminate to or through release liner. For matrix stripping the stock is die cut to one release liner and a matrix surrounding the labels is stripped from the release liner leaving a plurality of labels on the release liner. Matrix strip is described for instance in U.S. Pat. No. 4,619,851 to Sasaki et al incorporated herein by reference.

While not limiting, the following examples are illustrative of the practice of the instant invention. Test methods utilized were as follows: Shear by ASTM D-3654-78 and D-1000-60 and PSTC (Pressure Sensitive Tape Council) Test #7, 8th Ed.; Peel by PSTC #1; and Loop Tack by PSTC #7.

EXAMPLE 1

There was formed a surfactant solution comprising, on a parts by weight basis, 123.71 parts deionized water, 1.30 parts tetrasodium pyrophosphate, 27.2% surfactants.

There was separately formed a monomer mixture containing on a percent by weight basis 157.34 parts 2-ethylhexyl acrylate, 384.84 parts n-butyl acrylate, 8 parts methyl acrylate and 16 parts acrylic acid, and 1.63 parts silicone acrylate sold as RC-300 by Goldschmidt and 0.33 parts n-dodecyl mercaptan as a chain transfer agent. The monomer mixture was added to the surfactant solution in a weight ratio of 4 parts monomer to 1 part surfactant solution.

There was separately formed an incremental catalyst solution of 85 parts by weight deionized water and 2 parts by weight potassium persulfate as well as a minor amount of surfactant.

To a stirred, nitrogen blanketed reactor, following the charge of 190 parts by weight deionized water, 4.10 parts by weight surfactant and 1.43 parts potassium persulfate, there was incrementally added the monomers and surfactant solution with the catalyst solution at a rate to enable a reaction to be carried out with a slight exotherm. Temperature was kept between 80±2° C., and there was formed an emulsion having a total solids content of about 57.7%. The emulsion was then adjusted to a pH of 6.8 to 7.1 with the biocide-ammonia neutralizing solution. Table 1 compares the property of the emulsion adhesive to a commercial solvent based adhesive each coated on a 2 mil mylar substrate. The solvent based adhesive Control was manufactured and sold by Monsanto as Monsanto-GMS 1753.

TABLE 1

|  | Control (Monsanto-1753) | Example 1 |
|---|---|---|
| 180 Peel Adhesion | Comparable (2.0–6.0 lbs/in) | |
| Loop Tack | Comparable (1.7–3.0 lbs/in) | |
| 2 Shear Adhesion | | |
| At 70° C.; 1" × 1"/ 500 gm | Comparable (>1440 minutes) | |
| At 100° C.; 1" × 1"/ 500 gm | Comparable (>500 minutes) | |
| Gasoline Resistance | | |
| a) Unleaded Gasoline | Good | Good |
| b) 85/15 Bend of Unleaded Gasoline And Methanol | Poor | Fair-Good |
| c) 85/15 Blend of Unleaded Gasoline And Toluene | Good | Good |
| Water Resistance | Pass two-week immersing Test | |
| Water Spot Test | >24 hrs. | >2 hrs. <4 hrs. |
| Guillotine Performance | | |
| Rated on Blade/ Adhesive Smearing | Excellent/Good | Good/Good |
| Clarity | Good-Excellent | Excellent |
| Backing | 2 mil Mylar | |
| Vinyl Shrinkage on Liner | Fair-Good | Good-Excellent |
| Dry Coat Weight | 30 ± 2 gm/m² | |

*rated as degree of edge lift and swell after immersing in a given system for one hour.

The adhesives of the invention have been effectively coated at 20–50 g/m² and with tackification by the addition of Foral 85 at a level of 20–30% by weight based on the total weight of the polymer and tackifier.

Table 2 shows the 2° shear at 70° C. for the three composition measure using a 0.5"×0.5" sample loaded to 500 grams. The substrate was mylar.

TABLE 2

| Coat Weight | 2° Shear at 70° C., Min |
|---|---|
| 26 g/m² | 600–750 |
| 43 g/m² | 600–700 |
| 26 g/m², 23% Foral 85 | 10–15 |

EXAMPLE 2

The procedure of Example 1 was essentially repeated except that the monomer composition used on a dry basis was:

| Monomer | Parts by Weight |
|---|---|
| 2-ethylhexyl acrylate | 113.99 |
| butyl acrylate | 362.06 |
| vinyl acetate | 78.55 |
| methyl acrylate | 6.17 |
| acrylic acid | 13.56 |
| n-dodecyl mercaptan | 0.55 |
| silicone acrylate[1] | 1.50 |
| tripropylene glycerol diacrylate | 9.13 |

[1]Goldschmidt RC802

Reaction occurred over 3 hours at 78°–82° C. at a pH of 3–4 followed by neutralization to a pH of 6–7. Solids content was 58–69%. The product coated well on paper any mylar substrates both of which offered excellent processability.

EXAMPLE 3

The procedure of Example 1 was again repeated utilizing the monomer system in parts by weight as follows:

| Monomer | Parts by Weight |
|---|---|
| 2-ethylhexyl acrylate | 155. |
| butyl acrylate | 374. |
| methacrylic acid | 7.30 |
| acrylic acid | 17.90 |
| n-dodecyl mercaptan | 0.35 |
| silicone acrylate[1] | 6.5 |

Reaction occurred at temperature of 78°–81° C. yielding a product which, when cast on 2 mil mylar to a coat weight of 25–30 g/m² yielded a product having a water spot resistance of in excess of 1 hour with slight spotting only after 2 hours.

EXAMPLE 4

The procedure of Example 1 was essentially repeated but with the monomer system of Example 3 except that the silicone acrylate monomer was Goldschmidt RC-450 present in an amount of 2.9 parts by weight of the monomers. Water spot resistance was between 1 and 3 hours and 2° shear at 70° C. at a 500 gram load was in an excess of 1440 min.

EXAMPLE 5

The procedure of Example 4 was repeated except that silicone acrylate monomer content was 2.9 parts of the total monomers, the provided pressure sensitive adhesive polymer exhibited a water spot resistance of between 1 and 3 hours, a 70° C., and a 2° shear at 500 gram load was from 1000 to an excess 1440 minutes and 18 to 500 minutes at 100° C.

EXAMPLE 6

The procedure of Example 4 was repeated except that there was employed as the silicone acrylate monomer Goldschmidt RC-300 present in a concentration of about 2.4 parts by weight of the monomers. Water spot resistance was again between 1 and 3 hours with 2° shear in excess of 1440 minutes at 70° C.

EXAMPLE 7

Essentially the same results of Example 6 was obtained using as the silicone acrylate Goldschmidt RC-300 present in a concentration of about 2 parts by weight of the monomers and dodecyl mercaptan present in a concentration of 0.3 parts by weight of the monomers. Water spot resistance was again between 1 and 3 hours and 2° shear at 70° C. was in excess of 1440 minutes.

EXAMPLE 8

Essentially the same procedure of Example 7 was repeated except that the silicone acrylate content (RC-300) was about 1.7 parts by weight of the monomers. Again water spot resistance was between 1 and 3 hours while 2° shear was initially 1440 plus minutes and in excess of 8000 minutes after 3 months at 70° C. Initial 2 shear at 100° C. was in excess of 500 minutes.

What is claimed is:

1. A self adhesive stock use in tape, sheet and label manufacture which stock comprises in combination self supporting substrate providing on at least one surface said self supporting substrate a pressure sensitive adhesive coating formed of a tacky polymer prepared by emulsion polymerization which polymer comprises a polymerized amount of at least one reactive silicone acrylate polymer having an acrylate functionality of at least about 2, the total amount of polymerized silicone acrylate polymer present in the tacky polymer being from about 0.02 to about 1% by weight of the tacky polymer, at least one unsaturated carboxylic acid containing from 3 to about 5 carbon atoms, the polymerized carboxylic acid content of the tacky polymer being from about 3 to about 10 percent by weight of the polymer, the balance of the tacky polymer comprising at least one alkyl acrylate soft monomer the total alkyl acrylate of the tacky polymer being in an amount of at least 50% by weight of the tacky polymer, said tacky polymer having a glass transition temperature of less than about −15° C.

2. A self adhesive stock as claimed in claim 1 in which the reactive silicone acrylate polymer has acrylate functionality between about 2 and about 3.

3. A self adhesive stock as claimed in claim 1 in which the reactive silicone acrylate polymer is a linear dimethyl polysiloxane having acrylate functionality and a molecular weight between about 1,000 and 20,000 g/mol.

4. A self adhesive stock as claimed in claim 2 in which reactive silicone acrylate is present in a concentration of from about 0.2 to about 0.3 percent by weight of the tacky polymer.

5. A self adhesive stock as claimed in claim 3 in which reactive silicone acrylate is present in a concentration of from about 0.2 to about 0.3 percent by weight of the tacky polymer.

6. A self adhesive stock as claimed in claim 1 in which the polymerized unsaturated carboxylic acid content of the tacky polymer is from about 3 to about 6 percent by weight.

7. A self adhesive stock as claimed in claim 1 in which there is present in the tacky polymer from 0 to about 15 percent by weight of at least one hard monomer selected from the group consisting of methyl acrylate, vinyl acetate and mixtures thereof.

8. A self adhesive stock as claimed in claim 1 in which the alkyl acrylate is selected from the group consisting of butyl acrylate, 2-ethylhexyl acrylate and mixtures thereof.

9. A self adhesive stock as claimed in claim 1 in which the tacky polymer comprises from about 60 to about 70 percent by weight butyl acrylate and from about 20 to about 30 percent by weight 2-ethylhexyl acrylate.

10. A self adhesive stock for use in tape, sheet and label manufacture which stock comprises in combination, a self supporting substrate having on at least one surface thereof a layer of a pressure-sensitive adhesive tacky polymer prepared by emulsion polymerization said tacky polymer comprising a polymerized amount of at least one reactive silicone acrylate polymer having an acrylate functionality of at least about 2, the total amount of silicone acrylate polymer present in the tacky polymer being from about 0.02 to about 1% by weight being of the tacky polymer, at least one unsaturated carboxylic acid containing from 3 to about 4 carbon atoms, the polymerized carboxylic acid content of the tacky polymer being from about 3 to about 10 percent by weight of the tacky polymer, methyl acrylate present in the tacky polymer in an amount of from 0 to about 15% by weight of the tacky polymer, vinyl acetate present in the tacky polymer in an amount of from 0 to 15% by weight of the tacky polymer, butyl acrylate present in the tacky polymer of from about 60 to about 70% by weight of the tacky polymer and 2-ethylhexyl acrylate present in the tacky polymer in an amount of from about 20 to about 30% by weight of the tacky polymer, said tacky polymer having a glass transition temperature of less than about −15° C.

11. A self adhesive stock as claimed in claim 10 in which the reactive silicone acrylate polymer has an acrylate functionality between about 2 and about 3.

12. A self adhesive stock as claimed in claim 10 in which the reactive silicone acrylate polymer is a linear dimethyl polysiloxane having an acrylate functionality and a molecular weight between about 1,000 and 20,000 g/mol.

13. A self adhesive stock as claimed in claim 11 in which reactive silicone acrylate is present in a concentration of from about 0.2 to about 0.3 percent by weight of the tacky polymer.

14. A self adhesive stock as claimed in claim 12 in which reactive silicone acrylate is present in a concentration of from about 0.2 to about 0.3 percent by weight of the tacky polymer.

15. A self adhesive stock as claimed in claim 10 in which the polymerized unsaturated carboxylic acid content of the tacky polymer is from about 3 to about 6 percent by weight.

16. A self adhesive stock as claimed in claim 10 in which the unsaturated carboxylic acid is acrylic acid.

17. A self adhesive stock as claimed in claim 14 in which the unsaturated carboxylic acid is acrylic acid.

18. A self adhesive stock as claimed in claim 15 in which the unsaturated carboxylic acid is acrylic acid.

19. A self adhesive sheet guillotined from a stock comprises of a laminate of self supporting substrate and a release liner having between said self supporting substrate and release liner at least a layer of a pressure-sensitive adhesive formed of a tacky polymer prepared by emulsion polymerization which polymer comprises a polymerized amount of at least one reactive silicone acrylate polymer having an acrylate functionality of at least about 2, the total amount of polymerized silicone acrylate polymer present in the tacky polymer being from about 0.02 to about 1% by weight of the tacky polymer, at least one unsaturated carboxylic acid containing from 3 to about 5 carbon atoms, the polymerized carboxylic acid content of the tacky polymer being from about 3 to about 10 percent by weight of the polymer, the balance of the tacky polymer comprising at least one alkyl acrylate soft monomer the total alkyl acrylate of the tacky polymer being in an amount of at least 50% by weight of the tacky polymer, said tacky polymer having a glass transition temperature of less than about −15° C.

20. A self adhesive sheet as claimed in claim 19 in which the reactive silicone acrylate polymer has acrylate functionality between about 2 and about 3.

21. A self adhesive sheet as claimed in claim 19 in which the reactive silicone acrylate polymer is a linear dimethyl polysiloxane having acrylate functionality and a molecular weight between about 1,000 and 20,000 g/mol.

22. A self adhesive sheet as claimed in claim 19 in which reactive silicone acrylate is present in a concentration of from about 0.2 to about 0.3 percent by weight of the tacky polymer.

23. A self adhesive stock as claimed in claim 19 in which reactive silicone acrylate is present in a concentration of from about 0.2 to about 0.3 percent by weight of the tacky polymer.

24. A self adhesive sheet as claimed in claim 19 in which the polymerized unsaturated carboxylic acid content of the tacky polymer is from about 3 to about 6 percent by weight.

25. A self adhesive sheet as claimed in claim 19 in which there is present in the tacky polymer from 0 to about 15 percent by weight of at least one hard monomer selected from the group consisting of methyl acrylate, vinyl acetate and mixtures thereof.

26. A self adhesive sheet as claimed in claim 19 in which the alkyl acrylate is selected from the group consisting of butyl acrylate, 2-ethylhexyl acrylate and mixtures thereof.

27. A self adhesive sheet as claimed in claim 19 in which the tacky polymer comprises from about 60 to about 70 percent by weight butyl acrylate and from about 20 to about 30 percent by weight 2-ethylhexyl acrylate.

28. Matrix cut labels comprising a plurality of labels on a release liner and formed by die cutting a laminate of a layer of pressure-sensitive adhesive contained between a self supporting substrate and a release liner in which the substrate and adhesive layer are die cut to the release liner and a matrix surrounding the labels is removed leaving matrix cut labels on the release liner said pressure-sensitive adhesive layer comprising a tacky polymer prepared by emulsion polymerization which polymer comprises a polymerized amount of at least one reactive silicone acrylate polymer having an acrylate functionality of at least about 2, the total amount of polymerized silicone acrylate polymer present in the tacky polymer being from about 0.02 to about % by weight of the tacky polymer, at least one unsaturated carboxylic acid containing from 3 to about 5 carbon atoms, the polymerized carboxylic acid content of the tacky polymer being from about 3 to about 10 percent by weight of the polymer, the balance of the tacky polymer comprising at least one alkyl soft monomer the total alkyl acrylate of the tacky polymer being in an amount of at least 50% by weight of the tacky polymer, said tacky polymer having a glass transition temperature of less than about −15° C.

29. Labels claimed in claim 28 in which the reactive silicone acrylate polymer has acrylate functionality between about 2 and about 3.

30. Labels as claimed in claim 28 in which the reactive silicone acrylate polymer is a linear dimethyl polysiloxane having acrylate functionality and a molecular weight between about 1,000 and 20,000 g/mol.

31. Labels as claimed in claim 28 in which reactive silicone acrylate is present in a concentration of from about 0.2 to about 0.3 percent by weight of the tacky polymer.

32. Labels as claimed in claim 28 in which reactive silicone acrylate is present in a concentration of from about 0.2 to about 0.3 percent by weight of the tacky polymer.

33. Labels as claimed in claim 28 in which the polymerized unsaturated carboxylic acid content of the tacky polymer is from about 3 to about 6 percent by weight.

34. Labels as claimed in claim 28 in which there is present in the tacky polymer from 0 to about 15 percent by weight of at least one hard monomer selected from the group consisting of methyl acrylate, vinyl acetate and mixtures thereof.

35. Labels as claimed in claim 28 in which the alkyl acrylate is selected from the group consisting of butyl acrylate, 2-ethylhexyl acrylate and mixtures thereof.

36. Labels as claimed in claim 28 in which the tacky polymer comprises from about 60 to about 70 percent by weight butyl acrylate and from about 20 to about 30 percent by weight 2-ethylhexyl acrylate.

* * * * *

UNITED STATES PATENT AND TRADEMARK OFFICE
CERTIFICATE OF CORRECTION

PATENT NO. : 5,234,736
DATED : August 10, 1993
INVENTOR(S) : Ivan S. P. Lee

It is certified that error appears in the above-indentified patent and that said Letters Patent is hereby corrected as shown below:

On cover page, item

[56] References Cited, U.S. PATENT DOCUMENTS, line 13,
change "4,333,867   6/1982   Saunton....524/547"
to     -- 4,333,867   6/1982   Sauntson...524/547 --

Column 1, line 61, after "polymers," change "use" to -- used --.

Column 2, line 13, before "water" change "on" to -- one --.
Column 2, line 32, after "surface" delete "a".

Column 3, line 21, after "Also present" delete "and present".

Column 5, line 35, the line before "Gasoline Resistance" insert an asterik.
Column 5, line 37, after "b) 85/15" change "Bend" to -- Blend --.

Column 6, line 35, after the Example 3 table, insert after line 35 -- $^1$Goldschmidt RC 802 --.
Column 6, line 38, change "temperature" to -- temperatures --.
Column 6, line 41, after "resistance" delete "of".
Column 6, line 49, after "was in" delete "an".

Column 7, line 18, after "Initial" change "2" to -- 2° --.

UNITED STATES PATENT AND TRADEMARK OFFICE
CERTIFICATE OF CORRECTION

PATENT NO. : 5,234,736
DATED : August 10, 1993
INVENTOR(S) : Ivan S. P. Lee

It is certified that error appears in the above-indentified patent and that said Letters Patent is hereby corrected as shown below:

In the Claims:

Column 8, line 59, change "comprises" to -- comprised --.

Column 10, line 8, change "0.02 to about %" to
-- 0.02 to about 1% --.

Signed and Sealed this

Twenty-fourth Day of May, 1994

Attest:

BRUCE LEHMAN

Attesting Officer        Commissioner of Patents and Trademarks